July 18, 1967

G. L. MacKAY ETAL 3,331,185

WRAPPING MACHINE

Filed June 11, 1964

INVENTORS
GEORGE L. MacKAY
BOBBY B. JONES
WILLIAM GROVER ROBINSON

July 18, 1967

G. L. MacKAY ETAL 3,331,185

WRAPPING MACHINE

Filed June 11, 1964

G. L. MacKAY ETAL

3,331,185

WRAPPING MACHINE

Filed June 11, 1964

United States Patent Office 3,331,185
Patented July 18, 1967

3,331,185
WRAPPING MACHINE
George L. MacKay, Bobby B. Jones, and W. Grover Robinson, Ocala, Fla., assignors, by mesne assignments, to Anderson Electric Corporation, a corporation of Alabama
Filed June 11, 1964, Ser. No. 374,332
18 Claims. (Cl. 53—180)

This invention relates to packaging apparatus and more particularly to a wrapping machine using heat sealable web material to completely enshroud an article and the method therefor.

In spite of the highly developed state of the art in the packaging field there still remains tremendous possibilities for substantial advances in the art. The development of new packaging materials and unlimited control apparatus has enabled the packaging field to make unprecedented advances in automatic packaging. There has long been a need for automatic or semi-automatic packaging apparatus suitable for rapidly and economically wrapping such items as record envelopes and the like wherein it is desirable to completely wrap and seal the article to make certain that foreign matter does not reach the article and to also prevent tampering or switching of the article in its wrapper. It was with this thought in mind that the wrapping machine of this invention was created.

It is therefore an object of this invention to provide a machine for wrapping articles such as record envelopes, or any other relatively flat prepackaged item, with a heat sealable web.

It is another object to provide a wrapping machine which will rapidly and economically enshroud articles with a heat sealable web material.

It is yet another object to provide a wrapping machine which is at least semi-automatic in operation and yet includes a very minimum of controls for accomplishing same.

It is yet another object to provide a wrapping machine having a source of continuous heat sealable web material wherein the machine comprises folding means for forming the web into a U-shaped trough, means for maintaining the free ends of the so formed web trough in spaced apart relation to allow insertion of articles therein in longitudinal spaced relation, means for bringing together and gripping the free ends of the web trough with the articles therein and longitudinally carrying the thus closed and loaded web, means for heat sealing and severing the loaded web perpendicular its length in the web portion between articles carried therein and means for heat sealing and severing the loaded web generally parallel to and beneath the means for closing, gripping and carrying the web between successive perpendicularly heat sealed and severed web portions to complete the heat sealing of the web and free the completely wrapped article from that portion of the web still gripped and carried by the web closing, gripping and carrying means.

The above and other objects and advantages will become more apparent when taken in conjunction with the following detailed description and drawings, showing by way of example one preferred embodiment of this invention, and wherein.

The wrapping machine of this invention basically comprises means for rotatably carrying a roll of heat sealable web material, folding means for forming the web into a U-shaped trough, means for maintaining the free edge portions of the web trough in spaced apart relation to thereby provide an opening to allow for introduction of articles to be wrapped, means for bringing together and gripping the free edge portions of the web trough with the articles therein and longitudinally carrying the thus closed web to the heat sealing and severing station, means for heat sealing and severing the loaded web perpendicular its length in the spaces between articles and means for heat sealing and severing the loaded web generally parallel and beneath the means for closing, gripping and carrying the web so as to free the completely wrapped article therefrom.

Figure 1:
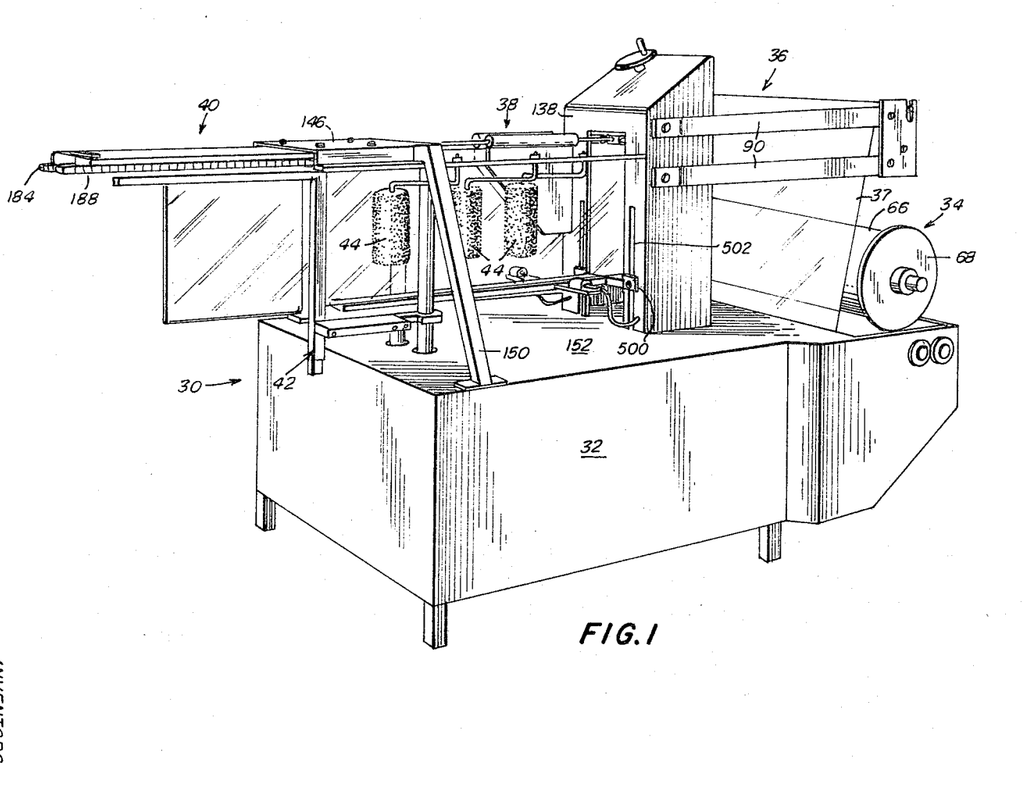
FIG. 1 is an isometric view of the overall machine taken from the forward end thereof.
Figure 2:
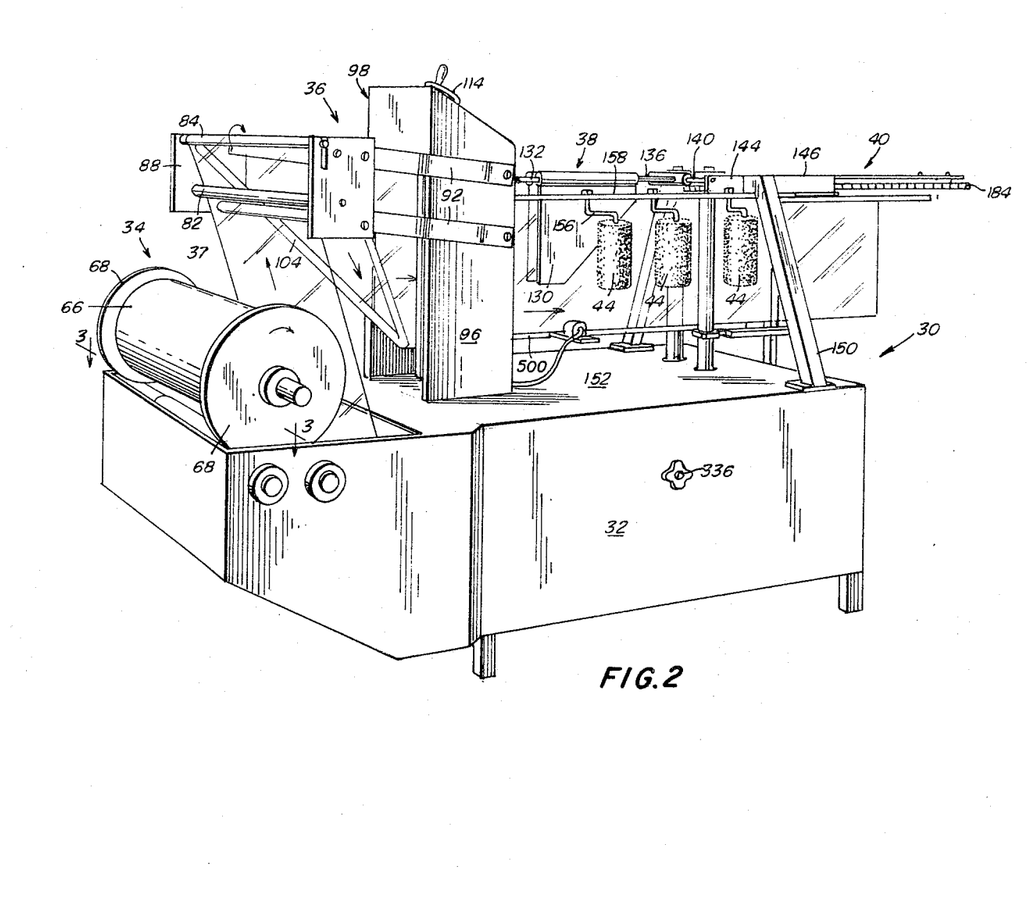
FIG. 2 is an isometric view of the overall machine taken from the rearward end thereof.

Referring to FIGS. 1 and 2, the wrapping machine 30 comprises a base assembly 32 mounting a web feeding unit 34 positioned at the rearward portion thereof and a vertical web folding and fold height adjustment assembly 36 for folding the web 37 into a U-shaped trough of given height. An adjustable vertical loading hopper 38 providing a loading station is positioned immediately adjacent the folding assembly 36 to maintain the free edge portions of the web in spaced apart relation. Directly therebeyond there is located the web closing, gripping and carrying assembly 40. Heat sealing and severing means 42 is positioned at the forward end of the machine below the web closing, gripping and carrying assembly 40. A plurality of nylon fleece guide rollers 44 serve to maintain proper and close contact between the web and the articles therein prior to the time the web is engaged by the web closing and gripping assembly 40. The major portion of the mechanisms for operating and actuating the moving parts of the machine are positioned within the base housing and are illustrated in various other figures of the drawings.

Figure 3:
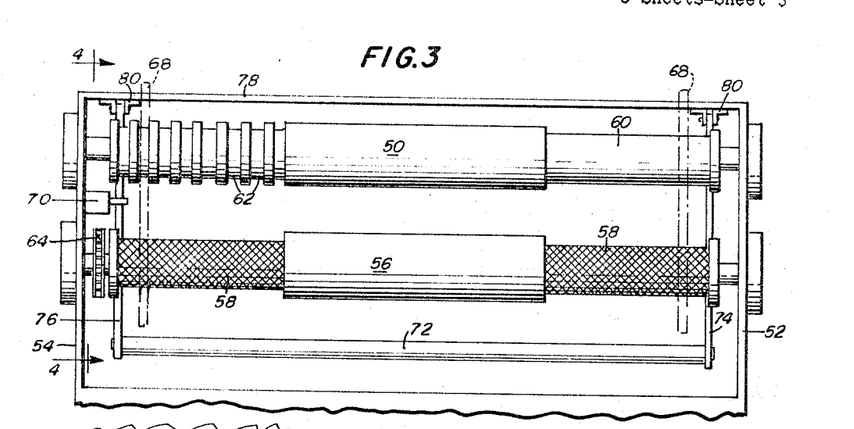
FIG. 3 is a plan view taken along line 3—3 of FIG. 2 and illustrates the two rollers which drive and support the web roll.
Figures 4, 5:
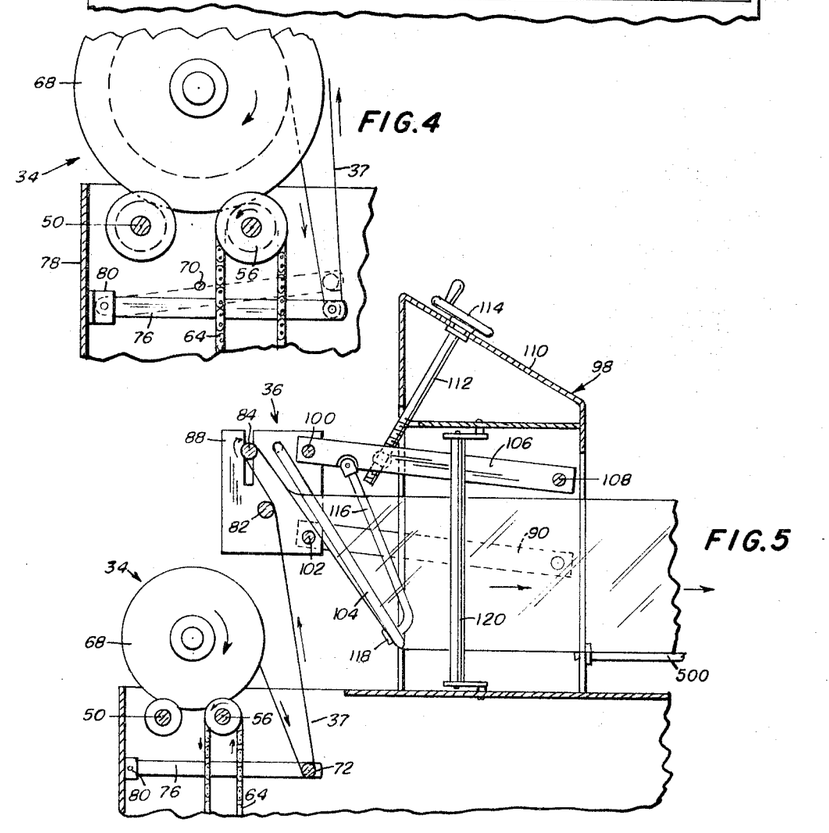
FIG. 4 is an elevational view partly in section taken along line 4—4 of FIG. 3 and further illustrates the mounting and drive means for the web roll and also the loop forming arrangement.
FIG. 5 is a side elevational view partly in section taken along lines 5—5 of FIG. 6 and shows the manner in which the web is fed from the roll and the means for adjusting the vertical position of the folded web.

As best illustrated in FIGS. 3–5 the web feed unit 34 comprises horizontally and transversely positioned idler roll 50 rotatably mounted between parallel side walls 52–54 of the base 32. Driven roll 56 is likewise mounted between side walls 52–54 parallel to idler roll 50. It will be noted that driven roll 56 has reduced end portions 58—58 both of which have knurled or otherwise roughened surfaces. The idler roll 50 has a reduced portion 60 on one end and a series of spaced annular grooves 62 on the other. The reduced portion of both rolls are of the same diameter for reasons which will be obvious later. The driven roll 56 is rotated by means of sprocket chain 64 which drivingly connects the roll with a power source which is not shown.

The heat sealable web 37 is carried on and fed from a roll 66 having enlarged end caps 68—68 as best illustrated in FIG. 2. Roll 66 is supported by rolls 50 and 56, end caps 68—68 riding on the reduced portions 58 of driven roll 56 and reduced groove 60 and the base of an annular portion 62 of idler roll 50 as shown in dotted lines in FIG. 3 and full lines in FIG. 4. The annular grooves 62 on roll 50 are useful in maintaining proper alignment of the web roll 66. This machine will operate with webs of different widths which will come on rolls of correspondingly different lengths; thus it is necessary to have a plurality of spaced annular guides 62 to accommodate rolls of various lengths.

As is apparent from FIGS. 3–5 web roll 66 is driven by engagement of the knurled portions 58 of driven roll 56 with end caps 68. Control of the feed of the web is accomplished by means of microswitch 70 in the following manner. The web 37 is fed from roll 66 down under a transverse constant tension roller 72 rotatably carried by parallel bars 74 and 76 pivotally mounted on the end wall 78 of the housing 32 by means of bracket and pin assemblies 80. The microswitch 70 is arranged so that upon movement of the bar 76 upwardly the microswitch will be engaged and start the power source to operate sprocket chain 64 and thereby feed out additional web until the circuit is again broken by the bar 76 dropping out of switch contact.

Figure 6:
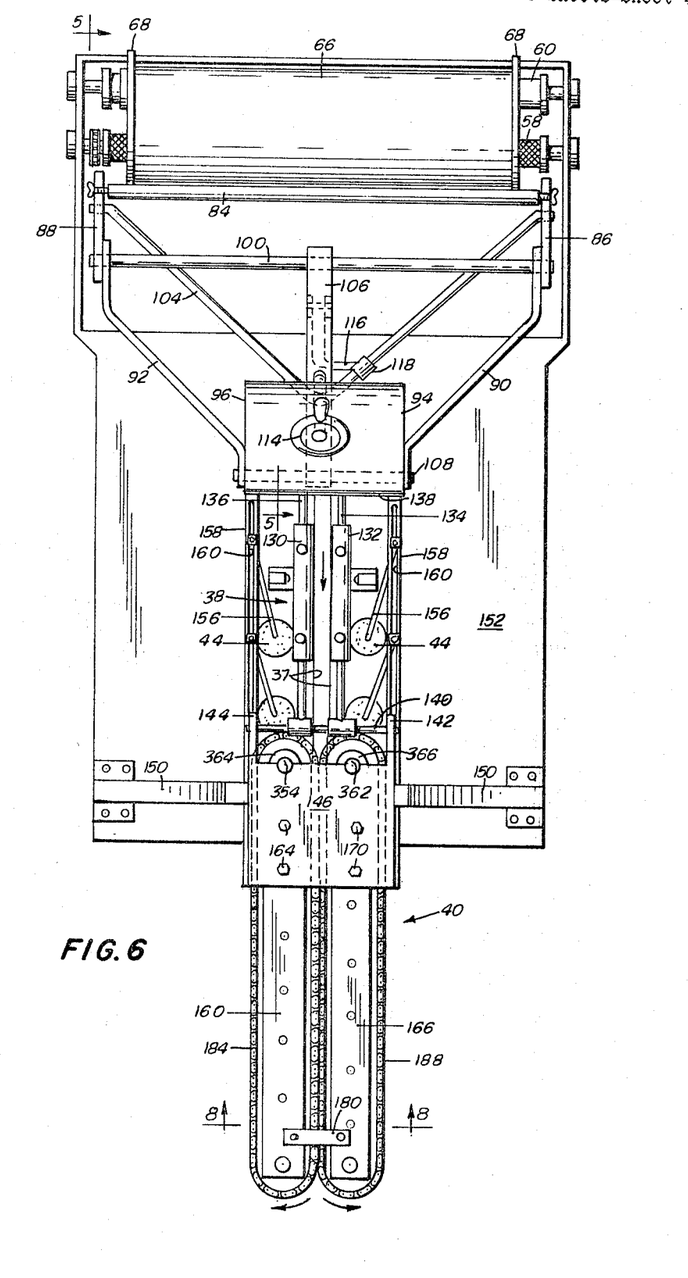
FIG. 6 is a top plan view of the overall machine.
Figure 7:
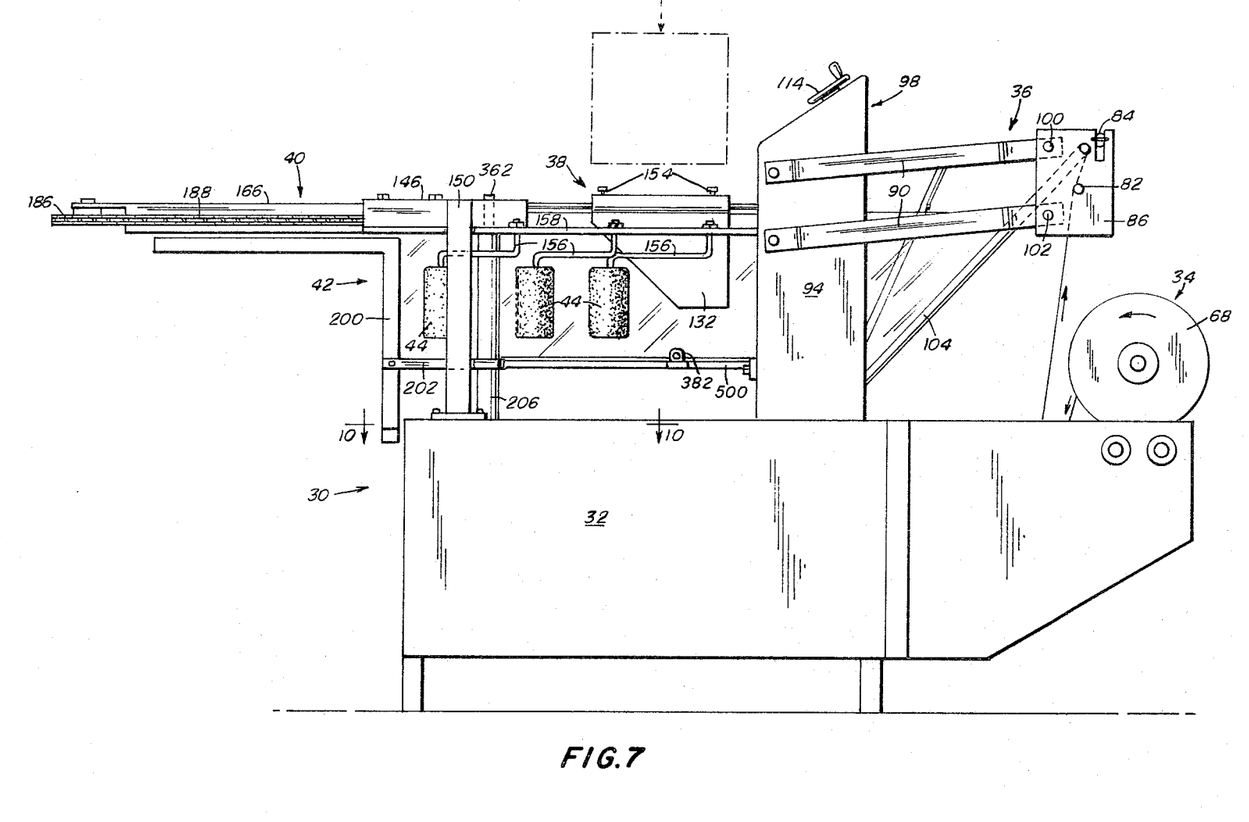
FIG. 7 is a side elevational view of the overall machine.

After the web 37 is fed off the web roll 66 it proceeds under the tension roller 72 and then to the folding and fold height adjusting assembly 36. As best illustrated in FIGS. 5–7 assembly 36 comprises a pair of transverse horizontal guide rollers 82 and 84 mounted in end plates 86 and 88 which are in turn supported by two pairs of parallel arms 90 and 92 pivotally mounted on the side walls 94 and 96 of the upper base housing 98. Parallel arms 90 and 92 are pivotally connected to plates 86 and 88 by means of transversely extending rods 100 and 102. A V-shaped fold bar 104 is swingably mounted from the parallel plates 86 and 88 to form the initial fold of the web 37.

The web fold height adjusting mechanism comprises an adjusting bar 106 pivotally mounted on shaft 108 supported between side walls 94 and 96 of the upper base housing 98 and pivotally attached to rod 100 between plates 86 and 88. As indicated in FIG. 6, adjusting bar 106 is centrally positioned between side walls 94 and 96 of the upperbase housing 98. The upper base housing 98 includes a slopping upper panel 110 which rotatably mounts fold bar adjusting screw 112. The lower end portion of this adjusting screw is threaded and is threadably engaged in adjusting bar 106. The upper end of screw 112 is provided with a crank 114 for rotating the screw. In order to properly support and position V-shaped fold bar 104 a support rod 116 is pivotally secured to adjusting bar 106 and is connected to the V-shaped fold bar at point 118.

After the web 37 passes over V-shaped fold bar 104 and is partly formed into a U-shaped configuration the so formed web is engaged by vertical fold guide rollers 120 pivotally mounted within the upper base housing 98 immediately adjacent the forward extremity of the fold bar 104 on each side of the web 37 to thus finally form the web into a U-shaped trough.

After the web is formed into a U-shaped trough it proceeds to the vertical loading hopper 38. This hopper comprises a pair of spaced plates 130 and 132 slidably mounted on parallel and spaced rods 134 and 136 respectively which rods are secured at one end to the forward face 138 of upper base housing 98 and at the other end to transverse rod 140 supported between lugs 142 and 144 of channel support member 146. This channel support member 146 is held in position above the base 32 by means of inclined legs 150 whose lower ends are secured to the horizontal surface 152 of the base 32. The hopper plates 130 and 132 fit down inside the U-shaped web trough to maintain the necessary opening for reception of articles to be wrapped. These plates may be provided with set screws 154 to hold the plates in place on the rods 134 and 136.

A plurality of nylon fleece guide rollers 44 are positioned on both sides of the loaded web to maintain close contact between the articles and the U-shaped web trough within which they are positioned. Each roller is rotatably carried on a rod 156 adjustably carried on rails 158 having a longitudinal slot 160 therein to provide for longitudinal adjustability. The rails 158 are secured to the upper base housing 98 at one end and to the channel support member 146 at the other.

The web closing, gripping and carrying assembly 40 is best shown in FIGS. 6–9 and comprises a U-shaped channel 160 secured to the channel support 146 by suitable means such as nuts and bolts indicated by 164 so as to mount the channel with the open side facing inwardly. Another U-shaped channel 166 is also mounted on channel support 146 by suitable means such as nuts and bolts indicated as 170 with its open side facing inwardly. Another U-shaped channel 172 is positioned within the channel 166. Channel 172 is biased toward the center of the machine by means of spring 178. Channels 160 and 166 are held in proper spaced relation at their forward end by means of bracket 180 suitably secured to both channels.

Figure 8:
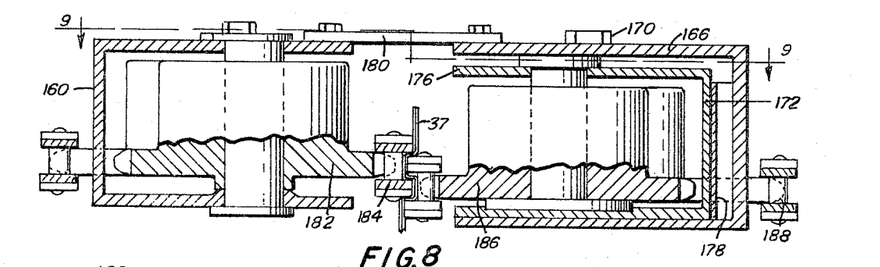
FIG. 8 is a cross sectional view taken along line 8—8 of FIG. 6 and illustrates a portion of the web engaging and advancing mechanism.
Figure 9:
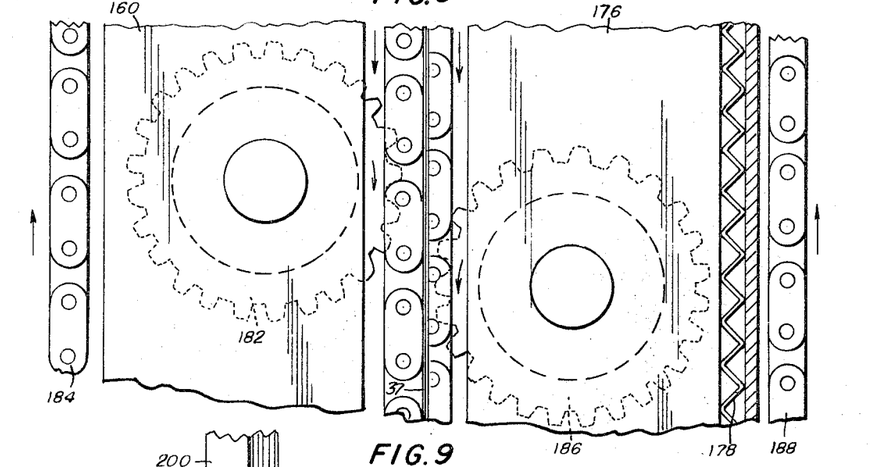
FIG. 9 is a plan view taken along line 9—9 of FIG. 8 and shows in plan a portion of the web engaging and advancing mechanism.

Channel 160 rotatably mounts a plurality of sprockets 182 which engage a driving chain 184 encircling the peripheral line formed by these sprockets. Likewise channel 172 rotatably mounts a plurality of sprockets 186 which engage a driving chain 188 encircling the peripheral line formed by these sprockets. As best shown in FIGS. 8 and 9 the driving chains 184 and 188 interengage each other in such manner that the links of one chain will ride down in the longitudinal recess between the parallel links in the other chain. The chains are maintained in such interengaged relation by means of spring 178 which forces channel 172 and the chain carried by the sprockets thereon to move inwardly. As best illustrated in FIG. 8 the free upper margins of the web 37 in trough form are brought together and closely gripped by the interengaging sprocket chains 184 and 188. The means for driving the sprocket chains will be described later on in connection with the power operation of additional mechanisms.

The means for heat sealing and severing the loaded U-shaped web is well shown in FIGS. 7, 17, 18, 19, 20 and 21. Basically the assembly 42 for heat sealing and severing comprises an inverted L-shaped carrier channel 200. The channel 200 is secured to rectangular channel 202 slidably and adjustably carried on bar 204 secured to rotatable sleeve 206. The rectangular channel 204 mounts a plurality of set screws 208 useful in maintaining adjusted position of the channel on bar 204.

Figures 19, 20, 21, 22, 23, 24, 25:
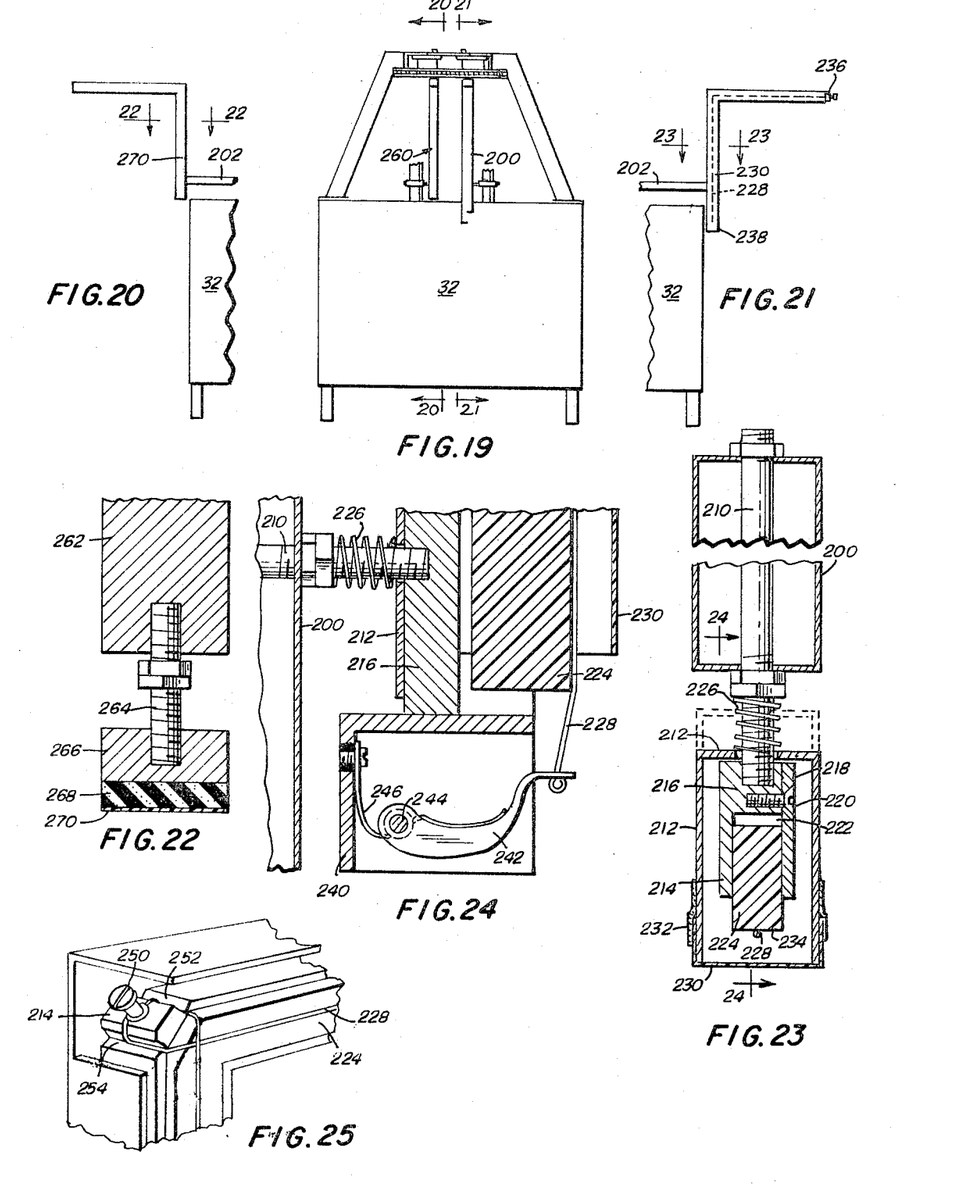
FIG. 19 is a front end elevational view of the overall machine with some details left off to more clearly show the relationship of the web advancing and the heat sealing and severing mechanism.
FIG. 20 is an elevational view taken along line 20—20 of FIG. 19.
FIG. 21 is an elevational view taken along line 21—21 of FIG. 19.
FIG. 22 is a horizontal cross sectional view taken along line 22—22 of FIG. 20.
FIG. 23 is a horizontal cross sectional view taken along line 23—23 of FIG. 21.
FIG. 24 is a vertical cross sectional view taken along line 24—24 of FIG. 23 and shows the spring means for maintaining tension on the heat sealing wire.
FIG. 25 is an isometric view of the corner portion of heat seal unit showing the manner in which the heat sealing wire is secured at the corner.

It is the L-shaped channel 200 which mounts the heat sealing and severing wire assembly. Referring to FIG. 23, channel 200 mounts a plurality of through bolts 210 suitably secured thereto. An L-shaped channel 212 U-shaped in cross section is spring mounted on these bolts in the following manner so that the two channels 200 and 212 will be aligned with each other and spring biased away from each other. One end of bolt 210 is threadedly received in offset supporting block 214 fitting within the channel 212 and generally coextensive therewith. The base portion 216 of block 214 is the enlarged portion which receives the threaded end portion of bolt 210. A flat strip 218 having a configuration in plan corresponding to block 214 is secured thereto by means of screws 220 to thus form a rectangular opening 222 which receives an L-shaped insulator block 224. Flat strip 218 is tightened down thereagainst to retain the insulator block in fixed position.

A helical spring 226 surrounds bolt 210 between confronting faces of channels 200 and 212 to maintain channel 212 spaced apart from channel 200. Pressure on the channel 212 in the direction of channel 200 will cause the spring 226 to be compressed and the channel 212 to assume the position shown in dotted lines. This movement allows for heating wire 228 supported on insulator block 224 to approach and come into contact with Teflon shield 230 which covers the open end of channel 212. This shield is held in place by means of tape 232 or any other suitable means.

The heating wire 228 is mounted on the face 234 of insulator block 224 and is fixed at end 236 by any suitable means and is spring tensioned at the other end 238 in a manner clearly illustrated in FIG. 24. A small bracket 240 is secured to base portion 216 of block 214 and pivotally mounts curved arm 242 on pin 244. A spring 246 is looped around pin 244 and has one end engaging arm 242 to bias it clockwise while the other spring end is secured to the bracket 240 by screw means in the bracket 240. The outer end of arm 242 engages the end of heating wire 228 to produce the desired amount of tension thereon.

In order to provide for a simple continuous heating wire 228 for both legs of the insulator block 224 an arrangement as illustrated in FIG. 25 is employed wherein the wire 228 is looped around pin 250 secured in the corner portion of block 214 such that the wire will ride in grooves 252 and 254 and be crossed in the manner indicated to produce a clean right angle corner as indicated in FIG. 25.

The back-up member 260 for the heat sealing and severing assembly comprises an inverted L-shaped block 262 having legs generally coextensive with and in alignment with channel 212. A plurality of bolts 264 adjustably support an L-shaped backing member 266 generally conforming to the configuration of the block 262. A layer of sponge rubber 268 covered with Teflon 270 is adhered to the face of the backing member 266. The inverted L-shaped block 262 is supported by a channel 202 in the same manner as channel 200 and illustrated in FIGS. 17 and 18.

The apparatus for actuating the web feed mechanism with the articles loaded therein and for heat sealing and severing is mostly housed in the covered portion of the machine base and is illustrated in FIGS. 10–16.

Figure 10:
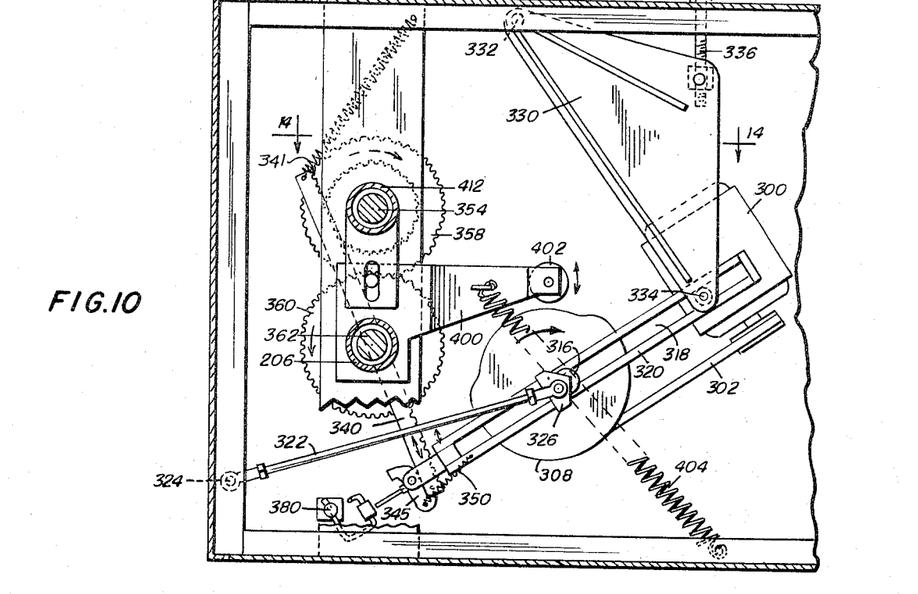
FIG. 10 is a plan view taken along line 10—10 of FIG. 7 illustrating the mechanisms for advancing the film and operating the heating, sealing and severing mechanism.
Figure 11:
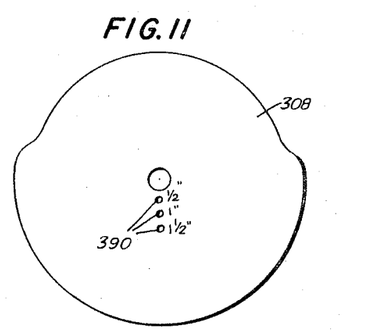
FIG. 11 is a plan view of the cam which actuates the heat sealing and severing mechanism and also actuates the web advancing mechanism.
Figure 12:
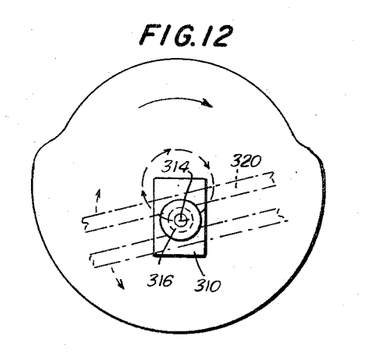
FIG. 12 is a plan view of the cam of FIG. 11 and further shows the off-center mounting of the connection to the web advancing mechanism.
Figure 13:
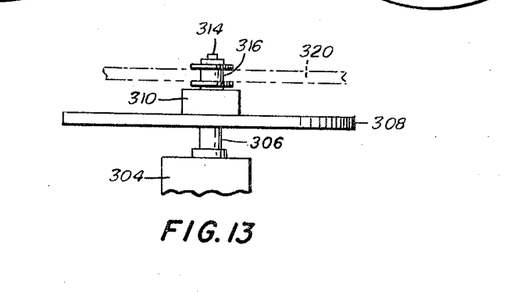
FIG. 13 is an elevational view showing the cam arrangement of FIG. 12.
Figure 14:
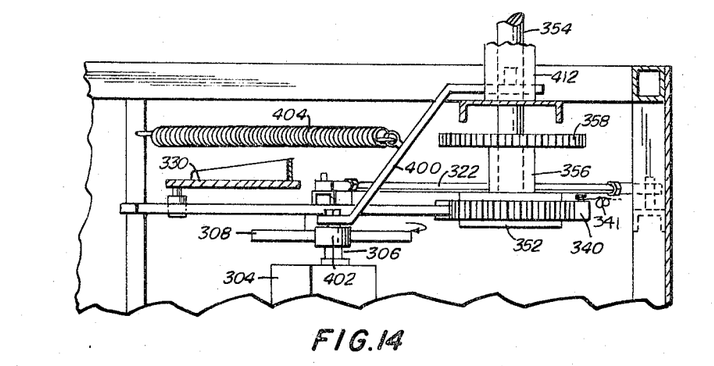
FIG. 14 is a cross sectional view taken along line 14—14 of FIG. 10 illustrating in elevation a portion of the web advancing mechanism and a portion of the heat sealing and severing mechanism.
Figures 15, 16:
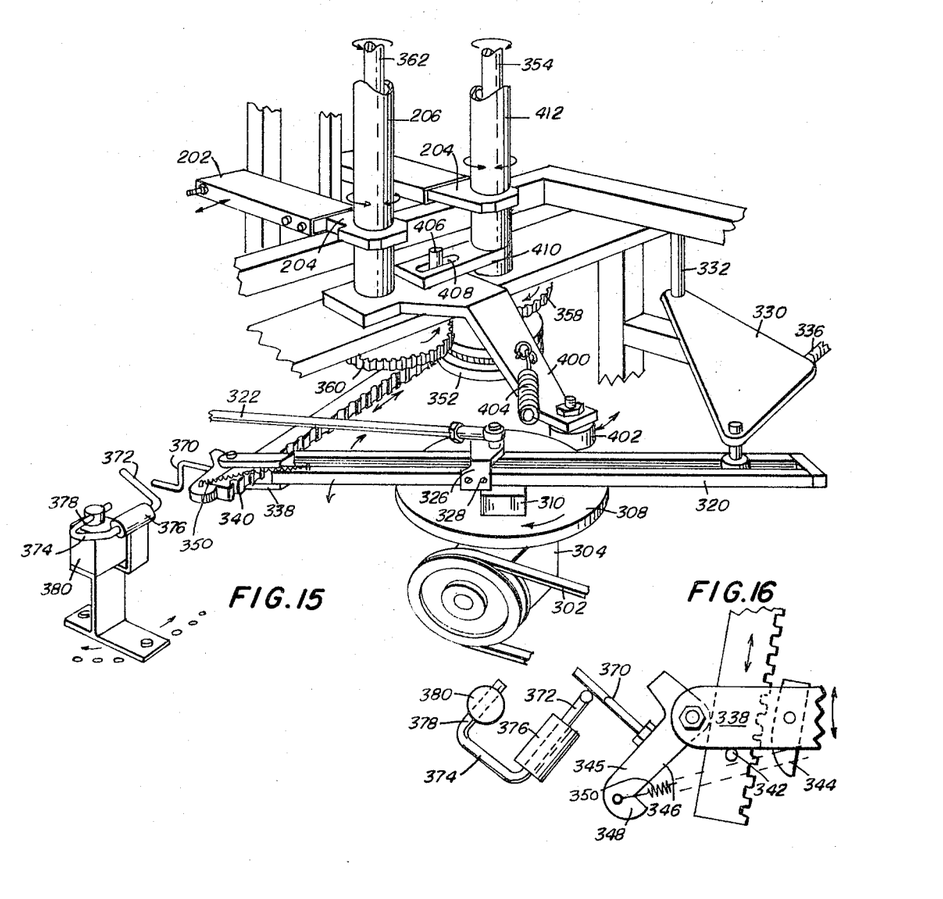
FIG. 15 is an isometric view of the major portion of the web advancing and heat sealing and severing mechanisms.
FIG. 16 is an enlarged plan view of the solenoid operated latch means for controlling web advance.
Figure 17:
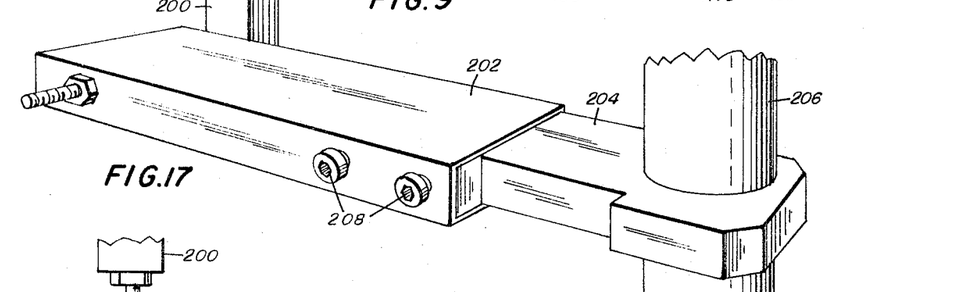
FIG. 17 is an enlarged isometric view of the arm which adjustably carries one part of the heat sealing and severing assembly.
Figure 18:
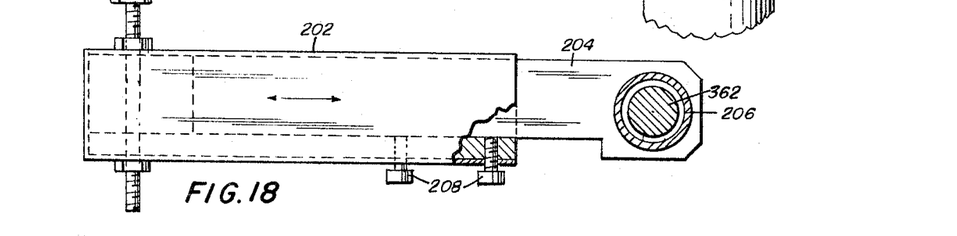
FIG. 18 is a top plan view of the FIG. 17 showing.

Taking first the web feeding portion, attention is particularly directed to FIGS. 10, 13 and 15 wherein an electric motor 300 by means of belt 302 drives reducer gear box 304 having a vertical output shaft 306 mounting a cam 308 for rotation therewith. A bearing block 310 is mounted on the upper face of the cam 308 and may be mounted in three off center positions on said cam as indicated in FIG. 11. The bearing block 310 rotatably mounts a dual and spaced flanged roller 316 by means of pin 314. As best shown in FIG. 10, the dual flanged roller 316 is slidably carried within slot 318 of slotted feed lever 320. It should be noted that the flanges of the roller 316 top and bottom overlie the portions of the feed lever adjacent thereto.

A control rod 322 is pivotally connected to the housing frame by a pin 324 or other suitable means while the other end of the rod is secured to the slotted feed lever 320 by means of a yoke 326 affixed to the end of the rod 322 and secured to the sides of the feed lever 320 by screws 328. A generally triangular feed adjusting plate 330 is pivotally mounted to the frame by pin 332. A second corner of the plate 330 carries a dual flanged roller 334 mounted in the slot 318 of feed lever 320 in a manner similar to roller 316. An adjusting screw 336 is rotatably carried in the frame and threadedly secured to the third corner of the adjusting plate 330.

The other end of feed lever 320 has a bifurcated bracket 338 extending longitudinally therefrom and slidably carries the end portion of feed rack 340 having a pin 342 therein to prevent the feed rack from being withdrawn from the bracket. A pivotally carried bumper 344 is mounted in the bracket 338 between the end portion of feed lever 320 and feed rack 340. A latch 345 is pivotally mounted at the end of bifurcated bracket 338 beyond the feed rack 340. This latch has a flat face 346 and an offset end portion 348 adapted to engage feed rack 340 in the manner illustrated in FIG. 10 wherein the offset portion 348 of the latch fits over the end of the feed rack and the latch face 346 is generally flush or at least close to the lengthwise face of the feed rack. A helical spring 350 secured to the latch portion 348 and the feed lever 320 serves to maintain the latch in engagement with the feed rack until unlatched by means to be described later.

The end of the feed rack opposite to that engaged by the latch drivingly engages a one way clutch 352 which has a vertical shaft 354 connected to and extending upwardly therefrom. A bushing 356 surrounds the shaft 354 immediately above the clutch 352 and supports a driving gear 358, both the gear and bushing being secured to shaft 354 for rotation therewith. Driving gear 358 meshes with gear 360 which has vertical shaft 362 secured to and extending upwardly therefrom.

Referring to FIG. 6, vertical shaft 354 mounts sprocket 364 and shaft 362 carries sprocket 366. These two sprockets engage sprocket chains 184 and 188 and drive same so as to produce clockwise movement of chain 184 and counterclockwise movement of chain 188. Sprockets 364 and 366 are of such diameter in relation to gears 358 and 360 and the one-way clutch 352 as to effect the requisite feed movement of the chains in relation to the length of the stroke of the rack 340.

As illustrated in FIGS. 10, 15 and 16 latch 345 is provided with an outwardly extending L-shaped latch arm 370 adapted to be engaged by offset portion 372 of latch keeper 374 pivotally mounted in bracket bearing 376. End portion 378 of latch keeper 374 is connected to solenoid 380 which when deenergized causes latch keeper 374 to be rotated to assume the position shown in FIG. 16 and thus causes latch keeper portion 372 to engage latch arm 370 and maintain the latch 345 out of engagement with feed rack 340. Energization of the solenoid results in engagement of the latch with the feed rack 340 as in FIG. 15. The solenoid 380 is controlled by photo electric cell 382 mounted immediately adjacent and below the feed hopper 38 as in FIG. 7. The P.E. cell senses whether or not there is an article in the web trough and, if there is, the solenoid is engaged and the feed rack 340 is moved by motion of the feed lever to ultimately rotate sprockets 364 and 366, thus moving the sprocket chains 184 and 188 to feed the closed web trough with the articles loaded therein. The cam 308 has a plurality of off center holes 390 for eccentrically mounting bearing block 310 on the cam 308 to provide a coarse adjustment for the web feed assembly. A spring 341 is secured to the end portion of feed rack 340 and to the base frame so as to maintain the rack in engagement with the one way clutch 352.

The means for operating the heat sealing and severing assembly is best shown in FIGS. 10–15 and comprises cam 308 having a dwell portion on its periphery of approximately 190 degrees and a lowered portion of about 150 degrees. An offset follower arm 400 rotatably carries cam follower 402 which generally rides on the peripheral surface of cam 308. A helical spring 404 having one end attached to follower arm 400 and the other end to the base frame serves to maintain follower 402 in contact with the cam throughout a portion of its periphery. The other end of follower arm 400 is secured to cylindrical shaft 206 which rotatably encircles vertical shaft 362. Inwardly of the cylindrical shaft 206 follower arm 400 has vertically and upwardly secured thereto a pin 406 riding in slot 408 of lever 410 secured to cylindrical shaft 412 rotatably mounted about rotating vertical shaft 354 whereby rotation of cylindrical shaft 206 in a clockwise sense will produce rotation of cylindrical shaft 412 in a counterclockwise sense to thus open and close the heat sealing and severing members.

As best illustrated in FIGS. 1, 2 and 7 the machine is provided with a longitudinal table support 500 vertically adjustably mounted in slots 502 of forward face 138 of the upper base housing 98. It will be noted that the P.E. cell 382 is slidably mounted on said table support for proper adjustment with respect to feed hopper 38. The table support 500 is adjusted vertically so that it will gently contact the bottom of the U-shaped web trough. This is not arranged to specifically carry the weight of the loaded web but rather to prevent canting or forward tilting of the articles therein when the folded web is fed forward.

The operation of this wrapping machine by now is reasonably obvious, however, for the sake of completeness, a brief description of its operation follows:

First of all the roll 66 of web material 37 should be placed on driven roll 56 and idler roll 50 in the manner illustrated in FIGS. 1, 3, 4 and 7 after which the free end of the web is threaded down under constant tension roll 72 then upwardly over transverse roll 82 and then behind and over transverse roll 84. After this the web is drawn down under V-shaped fold bar 104 as indicated in FIG. 5, then led between vertical guide rollers 120 to complete the formation of a vertical U-shaped trough. The side portions of the so formed web are then drawn over hopper plates 130 and 132 so that the free ends or upper margins of the web trough will be maintained in spaced apart relation. The so formed U-shaped web trough is then led to the gripping, feeding and advancing assembly 40 at the mouth of which the upper margins of the web trough are brought together and introduced into the interengaging sprocket chains 184 and 188 as best shown in FIG. 8. These chains are then artificially actuated by de-energizing the P.E. cell 382 to energize the solenoid and feed the closed web trough to the heat sealing and severing assembly 42.

With the web so placed in the wrapping machine 30 the machine is ready for operation with the power source for driving driven roller 56 in operation together with the microswitch control 70 associated with the constant tension roller 72 and the motor for driving belt 302 and associated gear reduction box together with the P.E. cell 382. The power source for the heat sealing and severing assembly 42 is also turned on and properly adjusted for desired temperature. With the machine so set up, a thin rectangular package 510 as illustrated in FIG. 7 is dropped down between hopper plates 130 and 132 into the web trough whereupon the P.E. cell 382 is deenergized by reason of interception of a beam of light otherwise transmitted through the web and the solenoid 380 is energized resulting in engagement of the latch 345 with the feed rack 340 as in FIG. 15 thus causing feed rack 340 to engage one way clutch 352 and rotate gear 358 and meshing gear 360 whereby vertical shafts 354 and 362 together with sprockets 364 and 366 are rotated to move sprocket chains 184 and 188, thereby effecting feed of the closed web until the P.E. cell 382 again senses that there is no article in the feed hopper (by reception of the beam of light transmitted through the web) whereupon the web advance ceases.

The loaded web is advanced stepwise to be properly positioned for heat sealing and severing. The confronting positioned pivotally carried inverted L-shaped heat seal members are adjustable longitudinally in the manner illustrated in FIGS. 17 and 18 wherein rectangular channel 202 is slidably carried on bar 204 and secured thereon by set screws 208. It is by this means that the inverted L-shaped heat sealing members are longitudinally adjusted depending on the length of the article to be wrapped. With the position of the heat sealing and severing members adjusted these members are opened and closed to engage the loaded web in the following manner. The sprocket chains 184 and 188 feed the loaded web to the heat seal and severing station and the heat sealing and severing members are closed by means of rotating cam 308 which is engaged by follower 402 on follower arm 400 in the manner illustrated in FIG. 10. It will be observed that in FIG. 10 the follower arm 400 and lever 410 which rotate the heat seal and severing members are so positioned that the heat sealing and severing members are in engagement with the loaded web. In this position the biasing spring 404 is almost fully compressed and the follower 402 is out of engagement with the lowered portion of the cam during which the heat seal and severing takes place. This arrangement constitutes an important safety feature since during this period the insertion of an article between the confronting members of the heat sealing and severing unit would seriously damage the mechanism and if the inserted article happened to be a finger the loss of same could easily result. Thus the confronting faces of the heat sealing and severing members may be separated having only to overcome the force of spring 404. After the heat sealing and severing the continued rotation of cam 308 and follower 402 riding thereon causes the heat sealing and severing members to swing outwardly to thus separate from each other and allow the feeding of another loaded web section. Referring to FIGS. 22 and 23 it will be observed that the Teflon coated rubber back up member 268 engages the closed web on one side and the slidable channel member 212 with its end covered with Teflon engages the closed web on the other side. With the web so held the heat sealing member continues to move toward the back up member 268 causes heat sealing wire 228 to contact the Teflon cover 230 and both heat seal and sever the closed web.

In using an inverted L-shaped heating and sealing assembly the loaded web is first sealed at its forward portion perpendicular to the longitudinal run of the web and in the next step the rearward perpendicular portion is heat sealed and severed together with the upper horizontal portion of the web to produce a completely wrapped article. The portion of the web gripped by the interengaging chains 184 and 188 and left by the heat sealing and severing of the web immediately therebelow is merely fed off the end of the machine as scrap.

A spring 341 has one end secured to the end of feed rack 340 and the other end is secured to the machine frame so that if a foreign object might somehow get in between interengaging chains 184 and 188 the feed rack 340 will slip over the gear on clutch 352 and thus prevent serious damage to the machine and possibly prevent bodily injury as well since no feed will then take place.

The web advance is adjusted by two means, first by positioning the cam 308 off center as indicated by pivot points 390 in FIG. 11. This constitutes a coarse adjustment. The fine adjustment is made by screw 336 which slightly varies the position of flanged roller 334 and thus changes the geometry of the path of the feed lever 320 and thus the stroke of feed rack 340.

In the event that it is desired to change the height of the folded web, crank 114 is rotated to raise or lower adjusting bar 106 and thereby vary the height of the V-shaped fold bar 104. Feed of the web off web roll 66 is controlled by microswitch 76 in a manner previously described. Obviously, a mercury switch could be used instead of microswitch 76.

Appropriate wiring and switching is provided to connect and operate the motors and heating elements that provide power for this wrapping machine. These details are conventional and do not constitute part of the applicant's invention.

Based on the foregoing it should now be clear that there has been devised a wrapping machine capable of wrapping articles, particularly flat thin articles, in an efficient and economical manner using a heat sealable plastic web to completely enshroud the article.

We claim:

1. A wrapping machine having a source of continuous heat sealable web material, said machine comprising folding means for forming the web into a U-shaped trough, means for maintaining the free ends of the so-formed web trough in spaced apart relation to allow insertion of articles therein in longitudinal spaced relation, means for gripping the closed free ends of the web trough with the articles therein and longitudinally advancing the thus closed and loaded web, means for heat sealing and severing the loaded web perpendicular its length in the spaces between articles therein and horizontally beneath the means for gripping and advancing the web from one perpendicular seal to the next so as to free the wrapped article from the web.

2. A wrapping machine particularly adapted for wrapping thin flat articles, said machine comprising means for rotatably carrying a roll of heat sealable web material, folding means for forming the web into a U-shaped trough, loading means for maintaining the upright portions of the U-shaped web in spaced apart relation to allow introduction of an article into the so formed trough, means for bringing together and gripping the upper free edge portions of the web trough and longitudinally advancing said loaded web, means for vertically heat sealing and severing said web between adjacent articles therein, and means for heat sealing and severing the closed upper edge portions of the web while it is supported by said means for bringing together, gripping and advancing said web to produce a completely enshrouded article.

3. The invention as described in claim 1 and wherein means are provided for manually adjusting the height of the bottom U-shaped web trough with respect to the means for maintaining the free ends of the web trough in spaced apart relation.

4. The invention as set forth in claim 1 and wherein sensing means are provided to determine whether or not an article has been placed in the web trough to actuate the means for advancing the web, and wherein means are provided to actuate the web gripping and advancing means in response to said sensing means.

5. The invention as set forth in claim 1 and wherein means are provided to maintain a prescribed amount of web ready for introduction to the web folding means.

6. The invention as described in claim 1 and wherein the means for maintaining the free ends of the web trough in spaced apart relation includes a loading hopper having downwardly projecting side plates riding within the web trough and longitudinally adjustable to provide for varying sizes of articles.

7. The invention as set forth in claim 4 wherein the means for actuating the web gripping and advancing means comprises a feed bar, means for oscillatably mounting said bar, means for oscillating said bar, means for adjusting the oscillation of the bar, a feed rack detachably connected to the feed bar, a latch for detachably connecting said feed rack to the feed bar, means responsive to said sensing means to operate said latch to connect or disconnect the feed rack with the feed bar, and means operatively connecting said feed rack with the web closing, gripping and advancing means.

8. The invention as described in claim 7 wherein the means for oscillatably mounting the feed bar comprises a cam plate and means for slidably securing the feed bar to the cam plate in an off center position, and wherein the means for oscillating said bar comprises power means for continuously rotating the cam plate.

9. The invention as described in claim 8 wherein the means for adjusting the oscillation of the feed bar comprises a triangular plate having one corner pivotally secured to the machine frame, a second corner pivotally and slidably connected to the feed bar remotely from the point where said feed bar is connected to the cam plate and an adjusting screw mounted in the frame and threadedly secured to the third corner of the triangular plate for adjusting the position of the triangular plate with respect to the feed bar.

10. The invention as described in claim 4 and wherein means are provided for actuating the heat sealing and severing means in timed relation with the web advance.

11. The invention as described in claim 10 and wherein the means for actuating the heat sealing and severing means comprises a rotating cam timed with the web advance, a cam follower engaging the cam surface, a lever mounting said follower, support means for the heat sealing and severing means, said lever being connected to the support means whereby rotation of the cam will cause the heat sealing and severing means to be actuated.

12. The invention as described in claim 7 and wherein the means for gripping the closed free ends of the web trough and longitudinally advancing same comprises two sprocket chains, sprockets carrying said chains to form a pair of elongated oval tracks, the two chains interengaging each other along one lengthwise portion of the track, the upper portions of the closed web being gripped between the interengaging chains for advancing therewith.

13. The invention as described in claim 12 and wherein the heat sealing and severing means comprises two inverted L-shaped members, one member being a back-up assembly and the other being one which carries a heated wire.

14. Apparatus for wrapping articles comprising means for guiding a web of flexible heat-sealable sheet packaging material which is folded to have opposed side portions extending from a longitudinal fold for travel through a loading station, with said side portions extending upward and spaced apart for loading of an article in the folded web at the loading station, means for feeding the folded web forward after the loading therein of an article at the loading station a distance such as to provide spaces between successive articles, means responsive to loading of an article in the folded web at the loading station for actuating said feeding means to feed the folded web forward said distance, and means operable on the folded and loaded web after the forward feed thereof for heat sealing together the upper margins of said side portions of the web longitudinally of the web and for heat sealing the folded web transversely of the folded web in said spaces between successive articles.

15. Apparatus as set forth in claim 14 adapted for utilization of a light-transmitting web and wherein said means responsive to deposit of an article in the folded web at the loading station comprises a photocell at the loading station receptive of a beam of light through the folded web at the loading station, the beam of light being intercepted by an article deposited in the folded web at the loading station for triggering actuation of the feeding means by said photocell.

16. Apparatus as set forth in claim 14 wherein said heat sealing means includes a transverse heat sealing member for effecting segmenting of the web as well as heat sealing of the web transversely of the web in said spaces.

17. Apparatus as set forth in claim 16 wherein said feeding means comprises movable feeding members which grip the upper margins of the side portions of the web.

18. Apparatus as set forth in claim 16 wherein said heat sealing means includes a longitudinal heat sealing member for heat and pressure to the upper margins of said side portions of the web along a longitudinal line of seal below said feeding members.

References Cited
UNITED STATES PATENTS

| | | |
|---|---|---|
| 2,272,530 | 2/1942 | Patterson _____________ 53—28 |
| 2,565,444 | 8/1951 | Waters. |
| 2,919,530 | 1/1960 | Garson et al. _________ 53—182 |
| 2,993,313 | 7/1961 | Hogan _____________ 53—28 X |
| 3,001,340 | 9/1961 | Gosman _____________ 53—28 |

GRANVILLE Y. CUSTER, JR., *Primary Examiner.*